US009327195B2

(12) United States Patent
Overton

(10) Patent No.: US 9,327,195 B2
(45) Date of Patent: *May 3, 2016

(54) ACCOMMODATING LATENCY IN A SERVER-BASED APPLICATION

(71) Applicant: Amazon Technologies, Inc., Reno, NV (US)

(72) Inventor: Adam J. Overton, Redmond, WA (US)

(73) Assignee: Amazon Technologies, Inc., Seattle, WA (US)

(*) Notice: Subject to any disclaimer, the term of this patent is extended or adjusted under 35 U.S.C. 154(b) by 42 days.

This patent is subject to a terminal disclaimer.

(21) Appl. No.: 14/203,425

(22) Filed: Mar. 10, 2014

(65) Prior Publication Data

US 2014/0335949 A1    Nov. 13, 2014

Related U.S. Application Data

(63) Continuation of application No. 12/885,296, filed on Sep. 17, 2010, now Pat. No. 8,668,582.

(51) Int. Cl.
| | |
|---|---|
| *A63F 9/24* | (2006.01) |
| *A63F 13/00* | (2014.01) |
| *G06F 17/00* | (2006.01) |
| *G06F 19/00* | (2011.01) |
| *A63F 13/30* | (2014.01) |

(52) U.S. Cl.
CPC ............ *A63F 13/12* (2013.01); *A63F 2300/534* (2013.01); *A63F 2300/538* (2013.01); *A63F 2300/5533* (2013.01); *A63F 2300/6653* (2013.01)

(58) Field of Classification Search
None
See application file for complete search history.

(56) References Cited

U.S. PATENT DOCUMENTS

| | | | |
|---|---|---|---|
| 6,061,722 | A | 5/2000 | Lipa et al. |
| 6,466,817 | B1 | 10/2002 | Kaula et al. |
| 7,849,491 | B2 | 12/2010 | Perlman |
| 8,150,675 | B1 | 4/2012 | Ortmanns et al. |
| 8,606,958 | B1 | 12/2013 | Evans et al. |
| 2003/0045808 | A1 | 3/2003 | Kaula et al. |
| 2006/0294221 | A1 | 12/2006 | Graupner et al. |
| 2007/0270135 | A1 | 11/2007 | Gaschler |
| 2009/0118019 | A1 | 5/2009 | Perlman et al. |
| 2010/0197405 | A1 | 8/2010 | Douceur et al. |
| 2011/0071978 | A1 | 3/2011 | Lottridge et al. |
| 2011/0096675 | A1 | 4/2011 | Li et al. |
| 2012/0028712 | A1 | 2/2012 | Zuili |

OTHER PUBLICATIONS

"World of Watercraft," Blizzard Entertainment, 2004, game manual.
IGDA Online Games SIG, "2004 Persistent Worlds Whitepaper," 2004.

*Primary Examiner* — Kevin Y Kim
(74) *Attorney, Agent, or Firm* — Knobbe, Martens, Olson & Bear, LLP

(57) ABSTRACT

Disclosed systems and methods facilitate a server-based gaming environment. In one implementation, a method includes transmitting a video stream of a gaming environment and a region definition for an object in the gaming environment to a client device. A result of a comparison of a location of a selection input in the gaming environment to the region definition is received from a client device. The result indicates that the location of the selection input identifies an area within the region definition. The object is selected based on the selection input corresponding to the region definition.

21 Claims, 10 Drawing Sheets

ACCOMMODATING LATENCY IN A SERVER-BASED APPLICATION

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Online entities offer a wide variety of electronic content and services to a variety of different devices, including personal computers (PCs), electronic book viewers, portable digital assistants (PDAs), mobile telephones, pocket PCs, smart phones, and set-top boxes such as televisions, digital video recorders (DVRs), and gaming consoles. These devices often access various web pages or web services, such as those associated with online gaming services.

For example, many online gaming services offer access to single and multi-player games in an online environment. Conventionally, an online game is implemented by a local client device (e.g., a personal computer) that is in communication with other client devices through the Internet such that each client device executes instructions to run a local gaming environment. In some implementations, the local client devices are responsible for image rendering and general game operation. Typically, once a local client device connects to an online gaming environment through a gaming server, the local client device will provide information that is relevant to the online gaming environment to the gaming server. For example, a local client device may transmit information that relates to the status of objects or graphical manifestations of other users in the gaming environment. By receiving information that relates to the status of objects or graphical manifestations of other users in the gaming environment, the server may monitor changes in the gaming environment that alter the gaming environment for other users. Since the game is installed on each local client device, and each local client device operates the game independently, throughout game play, data that updates the game state is transmitted by the local client device to the server and vice versa. However, this data transmission may experience a time delay because the local client devices are a distance away from the server. Furthermore, when receiving data from the server, each client device will need to render an appropriate image for display, which takes time. Latency delays due to data transmission and/or rendering of data may slow the game speed. Such latency can diminish the quality and enjoyment of the game experience for players of the game.

In contrast to the games discussed above, multi-player games have been implemented on the server rather than on the individual local client devices. In server-based game streaming environments, a video stream of the game is transmitted to a local client device. Server-based game streaming environments require relatively little computing power on the part of the local client device to effectively execute the game because, generally, the local client device need only receive and process a video stream.

Unfortunately, server-based game streaming environments also experience latency. In server-based gaming environments, data transmission speeds may cause the local client device to present the gaming environment at a time period that is slightly later than the current gaming environment at the server. In other words, this latency means that the user's perception of the current gaming environment is not an accurate perception of the gaming environment in the gaming server. Thus, if an object in the gaming environment moves before the user attempts to manipulate the object using a location-based input device (e.g., a mouse, trackball, tablet, keyboard-controlled cursor, etc.) in the gaming environment, the user may find that the position of the object in the gaming server is different from where the user perceives the object to be located. The user, in attempting to select or otherwise manipulate an object, may "miss" the object because of latency.

In view of the above, systems and methods are needed to overcome latency problems in server-based games in order to reduce selection misses.

BRIEF DESCRIPTION OF THE DRAWINGS

The accompanying drawings, which are incorporated in and constitute a part of this disclosure, illustrate various disclosed embodiments. In the drawings.

DETAILED DESCRIPTION

Figure 1:
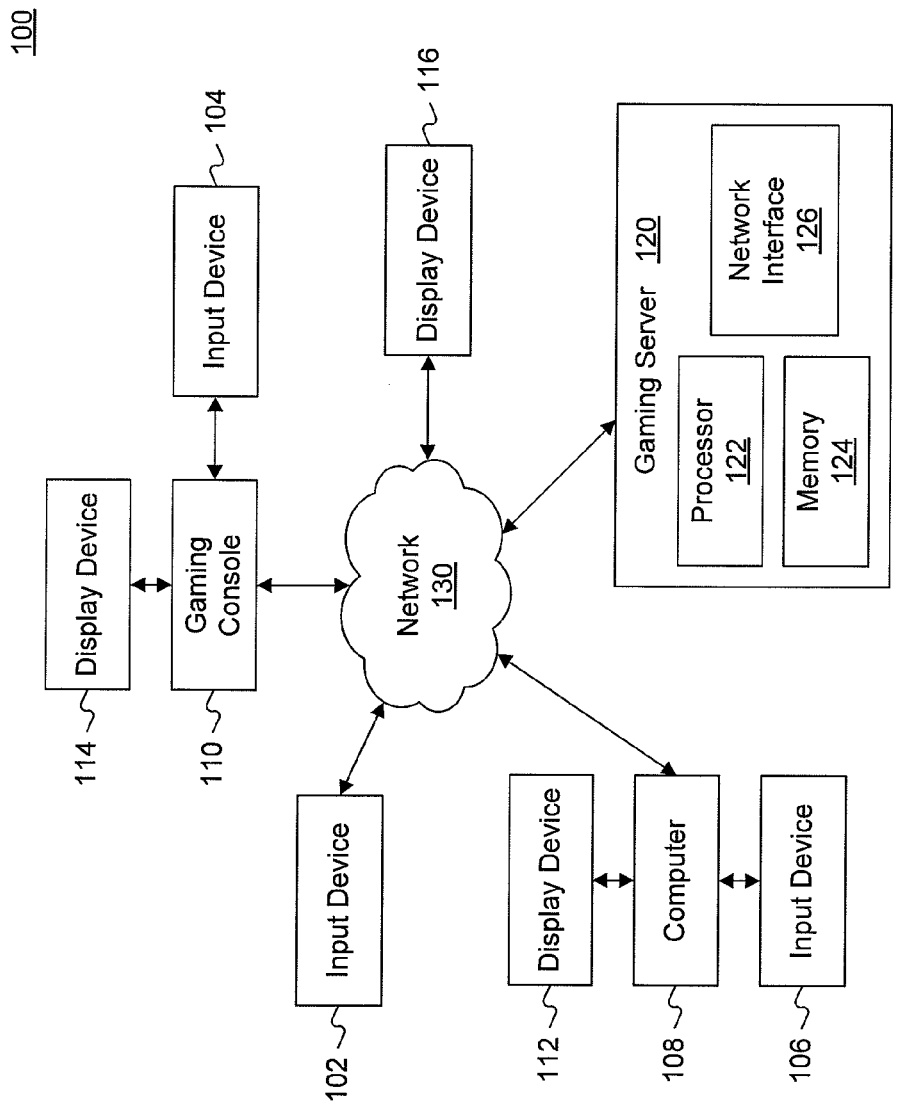
FIG. 1 is a diagram of an exemplary architecture of a system for accommodating latency.

Disclosed embodiments overcome latency delays between a gaming server and a client device (e.g., a gaming console) through the use of region definitions. A region definition may encompass an object or a part of an object in a gaming environment and may be used to monitor movement of the object or the part of the object in a game environment. Typically, region definitions are not displayed to players of the game. Rather, a region definition is a defined location within a game environment that is based on how an object within a game is displayed on a display screen. In some games, the gaming server may maintain an internal representation of the object that is two dimensional and, in other games, the gaming server may maintain a three dimensional view of the object. Accordingly, the region definitions may be screen-based according to the display of the gaming environment in two dimensional space by the client.

By monitoring the movement of a region definition and a location of the region definition in a game environment, a gaming server can determine the location of the object in the game environment at the time of a selection input (e.g., a command to select or manipulate an object) by a game player. For example, during game play, a player may select or otherwise manipulate an object in a gaming environment using an input device, such as a game controller. In many cases, the gaming server and the client devices are a distance a part and, consequently, the player may identify (e.g., using an input button of a game controller) an object for selection or manipulation that has already moved to a different location from the gaming server's perspective. Due to the time it takes to transmit data to the server, when the gaming server receives the command, the gaming server will interpret the player's input as a miss of the object.

To overcome latency, the gaming server may provide a region definition for the object in the gaming environment. For example, as part of the data provided from the gaming server to the client device, the gaming server may transmit a region definition for the object. When the player makes a selection of a location in the gaming environment (e.g., a selection of an object that the player wishes to select or manipulate), the client device may compare the location of the input selection to the region definition. The client device may determine that the location identifies an area within the region definition and, accordingly, may conclude that the object has been selected. The client device may then transmit data (e.g., metadata) to the gaming server indicating that the object has been selected in addition to informing the gaming server of the location in the game environment corresponding to the selection input. In some embodiments, the client may merely identify whether or not an input selection was within a region definition. Accordingly, the gaming server may understand that an object in the gaming environment was selected even though, from the server's perspective, the selected object has moved to a location outside of the region definition.

As an example, when a player of a first person shooter game aims a weapon and fires at an enemy character, the client device may determine the location at which the player has fired. Furthermore, the client device may compare that location with one or more region definitions to determine whether a region definition for the enemy character corresponds to the location at which the player has fired. A selection input that is located within the region definition may be treated as a selection or other manipulation of an object (e.g., the enemy character) encompassed by that region definition. Furthermore, the client device may then provide a message to the gaming server indicating what was clicked on so that the server can adjust the actual click point to compensate for the latency.

In some implementations, a region definition may apply to an entire object (e.g., a tree, an automobile, a character). In other implementations, a region definition may apply to a part of an object. For example, separate region definitions may apply to parts of a character (e.g., the arms, legs, head, etc. may correspond to one or more region definitions). Accordingly, disclosed embodiments enable a gaming server to compensate for latency by streaming a set of region definitions for the various objects in the gaming environment to the client device that allow the client device to know which object or objects in the gaming environment were selected locally. Additionally, the client device may send a message identifying what was selected to the gaming server. Based on that message, the gaming server may take an appropriate action with respect to the selected object or objects.

FIG. 1 is a diagram of an exemplary computing system 100 for accommodating latency in a server-based application, consistent with disclosed embodiments. System 100 may provide functionality that allows multiple client devices to interact with a server-based gaming environment. Although discussed in connection with a gaming environment, disclosed embodiments may apply to any other animated environment as well. The client devices may be user devices and operate using different standards or formats. Furthermore, each client device may operate in system 100 to manipulate the gaming or animated environment independent of other client devices that are connected to system 100.

In FIG. 1, system 100 includes input devices 102, 104, and 106, and client devices, such as computer 108, gaming console 110, and display devices 112, 114, and 116. System 100 further includes a gaming server 120, which provides a gaming or other animated environment to the client devices via a network 130. One of skill in the art will appreciate that although a certain number of components is depicted in FIG. 1, system 100 may include any additional or alternate number of these components. Furthermore, one of ordinary skill in the art will recognize that one or more of the components of system 100 may be combined and/or divided into subcomponents.

Input devices 102, 104, and 106 may each comprise a general purpose computer, a personal digital assistant (PDA), a portable navigation device, a mobile phone, a smart phone, an electronic book viewer, a game controller, a keyboard, a keypad, a mouse, a touch pad, a touch screen, a microphone, an accelerometer, a camera, a joystick, or one or more gaming controller buttons or any additional or alternate input device apparent to a person of ordinary skill in the art. In some implementations, input devices 102, 104, and 106 may transmit and receive data across network 130. In other implementations, input devices 102, 104, and 106 may transmit and receive data from another device located in proximity (e.g., in the same room) to input devices 102, 104, and 106. Display devices 112, 114, and 116 may each include, but are not limited to, an LCD, LED, CRT, or plasma display.

For example, as shown in FIG. 1, input device 102 may communicate with network 130 and may provide data to and/or receive data from gaming server 120 via network 130. Input device 102 may provide data to gaming server 120 for purposes of playing a game being displayed on display device 116. Furthermore, in this example, display device 116 may include appropriate hardware components for receiving data from network 130, transmitting data to network 130, and rendering graphics for a gaming environment.

In an alternative implementation, input device 104 may communicate with gaming console 110. For example, as shown in FIG. 1, input device 104 may provide data to and/or receive data from gaming console 110, which may communicate with gaming server 120 via network 130. In this example, gaming console 110 may render graphics for display on display device 114.

In yet another implementation, input device 106 may communicate with computer 108. For example, as shown in FIG. 1, input device 106 may provide data to and/or receive data from computer 108, which may communicate with gaming server 120 via network 130. Similar to gaming console 110, computer 108 may render graphics for display on display device 112. In some implementations, computer 108 may comprise a general purpose computer, such as a personal computer or a laptop computer. In other implementations, computer 108 may comprise a set-top box or other hardware for communicating with gaming server 120 over network 130.

Network 130 may represent any form or medium of digital data communication. Examples of network 130 include a local area network ("LAN"), a wireless LAN, e.g., a "WiFi" network, a wireless Metropolitan Area Network (MAN) that connects multiple wireless LANs, and a wide area network ("WAN"), e.g., the Internet, a private network, and an intranet. The Internet may include any publicly-accessible network or networks interconnected via one or more communication protocols, including, but not limited to, hypertext transfer protocol (HTTP) and transmission control protocol/internet protocol (TCP/IP). Moreover, network 130 may also include one or more mobile device networks, such as a GSM network or a PCS network, that allow mobile devices to send and receive data across network 130 via applicable communications protocols, including those described above.

Gaming server 120 may comprise a general purpose computer (e.g., a personal computer, network computer, server, or mainframe computer) having one or more processors that may be selectively activated or reconfigured by a computer program. Furthermore, gaming server 120 may be incorporated as a node in a distributed network. For example, gaming server may communicate via network 130 with one or more additional servers (not shown), which may enable gaming server 120 to distribute processes for parallel execution by a plurality of other servers.

As shown in FIG. 1, gaming server 120 may include a processor 122, a memory 124, and a network interface 126 for communicating via network 130. Processor 122 may include one or more processors (e.g., a CPU) configured to execute instructions and to process data to perform one or more functions associated with system 100, such as executing instructions to perform one or more of the computer-implemented methods described below. Network interface 126 may include any communication device for sending and receiving data over network 130.

Memory 124 may include one or more memory devices that store data, including, but not limited to, random access memory (RAM), read-only memory (ROM), a magnetic storage device (e.g., a hard disk), an optical storage medium (e.g., a CD- or DVD-ROM), a high-definition optical storage medium, an electronic storage device (e.g., EPROM or a flash drive), and/or other known data storage devices. Memory 124 may store an operating system (e.g., Windows, Linux, etc.) and one or more applications for performing the disclosed processes, which may be executed by processor 122. The applications may be implemented using applets, plug-ins, modules, and/or any other known software components. Although not shown in FIG. 1, any of the other components (e.g., input devices) of FIG. 1 may include memory devices comparable to those discussed above.

Memory 124 may also include an applications store (not shown) and a device store (not shown). For example, the applications store may include application programs that may be executed on gaming server 120. The applications programs may include gaming applications and any additional or alternate application program with which users may interact to participate in or view a gaming or animated environment via network 130.

The device store may include information specific to network connectivity and operational characteristics of one or more devices associated with network 130. For example, the device store may include a physical network address (e.g., a network address expressed using a networking addressing protocol of a physical network) for each device associated with network 130. Furthermore, the device store may include additional connectivity parameters associated with the devices of network 130, including, but not limited to, a connection speed, authentication parameters, a connection capability of the device (e.g. an ability to connect to a 3G wireless network), or any additional or alternate parameters. Additionally, the device store may store information identifying the devices associated with network 130. For example, the identifying information may include, but is not limited to, identifiers associated with the devices (e.g., device names, device serial numbers, or device manufacturers), and identifiers associated with users of the devices (e.g., a user name associated with a user of control device 102).

The device store may also store display-specific information for the devices associated with network 130. For example, the device store may store information identifying one or more display capabilities of devices, including, but not limited to, a display resolution, a display size, or any additional or alternate information apparent to one of skill in the art. For example, gaming server 120 may use the display specific information to translate instructions received from an input device (e.g., instructions associated with a movement of a mouse) into a corresponding output.

Consistent with disclosed embodiments, gaming server 120 may include functionality that allows multiple devices to interact with or access applications or services executing on gaming server 120. For example, an output of an application program or service executing on gaming server 120 may be transmitted to one or more devices within network 130 (e.g., computer, 108, gaming console 110, or display device 116). A user may, in such embodiments, interact with the application through instructions transmitted by an input device (e.g., input device 102,104, or 106). As discussed above, in some implementations, the input device may communicate over network 130 with gaming server 120 and, in other implementations, the input device may communicate with gaming server 120 via an intermediate device (e.g., computer 108 or gaming console 110).

In some embodiments, gaming server 120 may coordinate a game (e.g., character movement updates, environment updates) as well as send video to client devices (e.g., computer 108 or gaming console 110) for rendering the game. In other embodiments, gaming server 120 may send information to client devices that provide updates of characters and the game environment, but the client devices (e.g., computer 108 or gaming console 110) may execute a program that provides video to the client devices.

As discussed above, gaming server 120 may stream region definitions for one or more objects in a gaming environment to a client device (e.g., computer 108, gaming console 10, or display device 116). The client device may use the region definitions to determine which object or objects in the gaming environment were selected locally. Furthermore, the client device may send a message identifying the selected object or objects to gaming server 120.

Figure 2B:
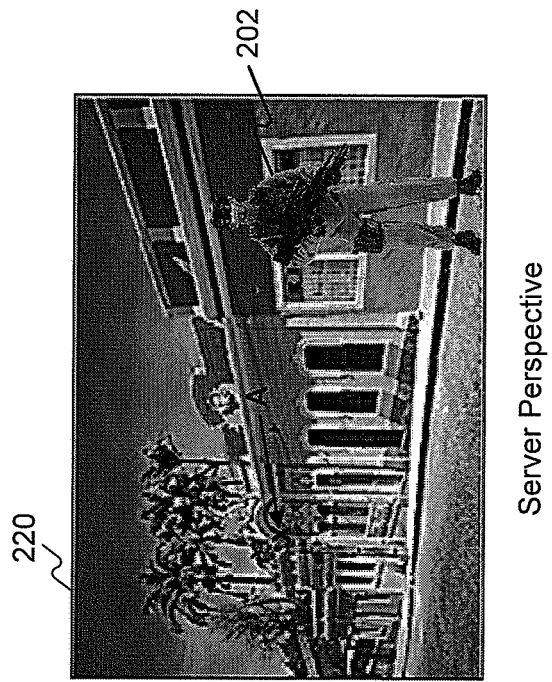
FIG. 2B is an example of the scene shown in FIG. 2A from the perspective of a gaming server.
Figure 2A:
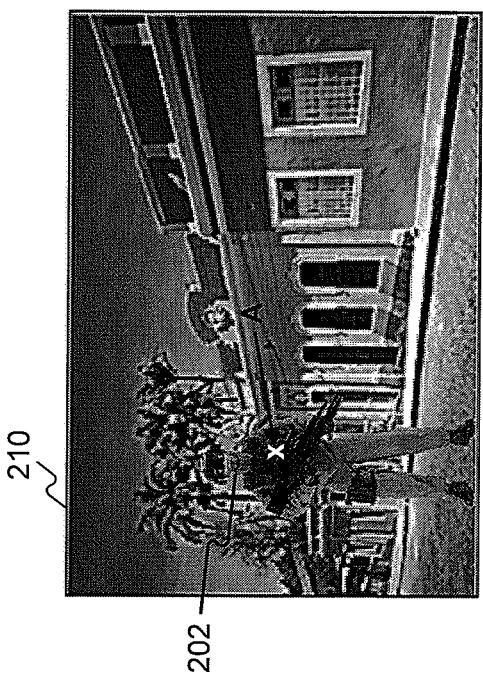
FIG. 2A is an example of a scene from the perspective of a client device.

FIG. 2A is an example of a scene 210 from the perspective of a client device (e.g., display device 116). Scene 210 shows a client perspective of a specific moment in time during game play. As shown, scene 210 includes a game environment of a street and buildings, as well as a character object 202.

For the purposes of this example, a user wishes to select character object 202. Location A, marked by an "X," indicates a location of a selection input received from an input device manipulated by the user. As depicted, from the client's perspective, location A is within the bounds of character object

202. If no latency existed, this selection would be adequate to identify a selection of character object 202. However, due to latency, when the server receives a selection input identifying location A from the client device, the state of the game environment from the server's perspective may not reflect that the location is inside the bounds of character object 202, as discussed below with respect to FIG. 2B.

Scene 220 of FIG. 2B is an example of scene 210 shown in FIG. 2A from the perspective of a gaming server (e.g., gaming server 120). As discussed above with respect to FIG. 2A, due to latency, the server may determine that the selection input location (i.e., location A) was not within the bounds of character object 202 and may, therefore, not select character object 202 according to the user's selection input. That is, location A, which is marked with an "X", will be selected and fall outside of character object 202. However, consistent with disclosed embodiments, when location and region definition information are applied, the server may compensate for the perceived difference in location of the selection input. Accordingly, the server may allow the user to select character object 202 even when, according to the server, character object 202 was not at a location of a selection input that was received by the server, as discussed below in further detail.

Figure 3B:
FIG. 3B is an example of region definitions for the third person scene shown in FIG. 3A.
Figure 3A:
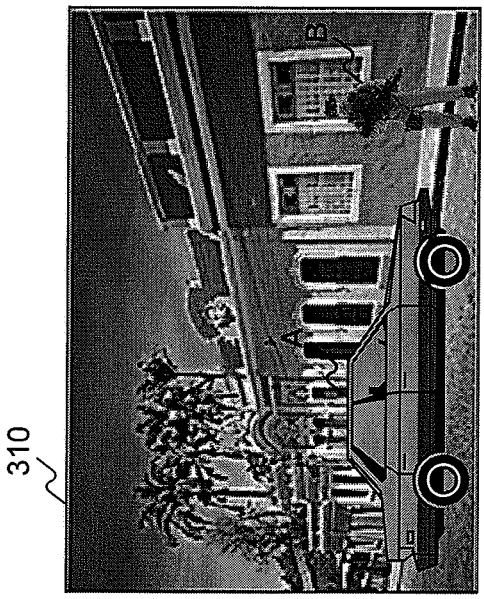
FIG. 3A is an example of a scene and region definitions for the scene from a third person perspective.

FIG. 3A is an example of a scene 310 having region definitions from a third person perspective, consistent with disclosed embodiments. As shown in FIG. 3A, scene 310 depicts a gaming environment that includes an object A (i.e., a vehicle) and a character object B (i.e., a soldier). In this example, the point of view represented by scene 310 may comprise a third person perspective. A third person perspective may include a "bird's eye" view of the character and the character's surroundings. For example, a player may control character object B in a game environment (e.g., a street with buildings).

FIG. 3B is an example of region definitions of the third person scene shown in FIG. 3A. Accordingly, FIG. 3B displays the server's perspective of the scene shown in FIG. 3A. It should be noted, however, that this view is solely a conceptual view for explanatory purposes and does not require that the server display the region definitions as part of the game. Rather, FIG. 3B merely illustrates exemplary region definitions for object A and character object B that the server may provided and which a client device may use to determine whether or not a selection input is located within the bounds of the object's defined region definition.

Each of object A and character object B are have accompanying region definitions, as shown in scene 320. Furthermore, as shown, the region definitions roughly correspond to the displayed objects in scene 310. In some implementations, region definitions may closely and precisely correspond to the shape of objects. In other implementations, it may be desirable for region definitions to be larger than corresponding objects in order to make it easier for players to select the objects. That is, a player's selection input need not be precise if a region definition extends beyond the shape of a particular object. Accordingly, the size and shape of region definitions can be altered, as desired, so as to be larger or smaller than the accompanying object depending on game design, game situation, or other factors. The size and shape of a region definition may further depend on a projection of an object. The projection of the object may comprise the relative size, shape, and manner in which the object is expressed to a viewer and depending on the viewer's perspective of the image.

Figure 3D:
FIG. 3D is an example of region definitions for the first person scene shown in FIG. 3C.
Figure 3C:
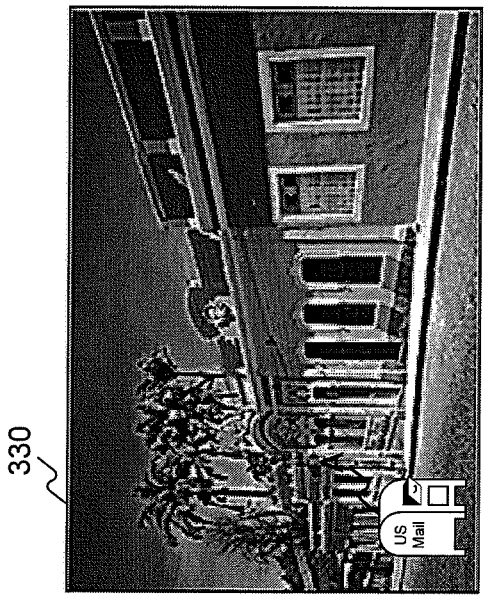
FIG. 3C is an example of a scene and region definitions for the scene from a first person perspective.

FIG. 3C is an example of a scene 330 having region definitions from a first person perspective, consistent with disclosed embodiments. For example, the point of view depicted in FIG. 3C may comprise a first person perspective showing an object A (e.g., a mailbox) that is located in a game environment (e.g., a street with buildings). Accordingly, this first person perspective displays the point of view that the character might see. In other words, the user may see through the character's eyes as the character views object A and the game environment.

FIG. 3D is an example of a region definition for scene 330. Similar to FIG. 3B, this view of scene 340 is solely a conceptual view for explanatory purposes and does not require that the server display the game or the region definition. Accordingly, FIG. 3D merely illustrates an exemplary region definition for object A that the server may apply to determine whether or not a selection input is located within the bounds of the object's defined region definition.

Figure 3E:
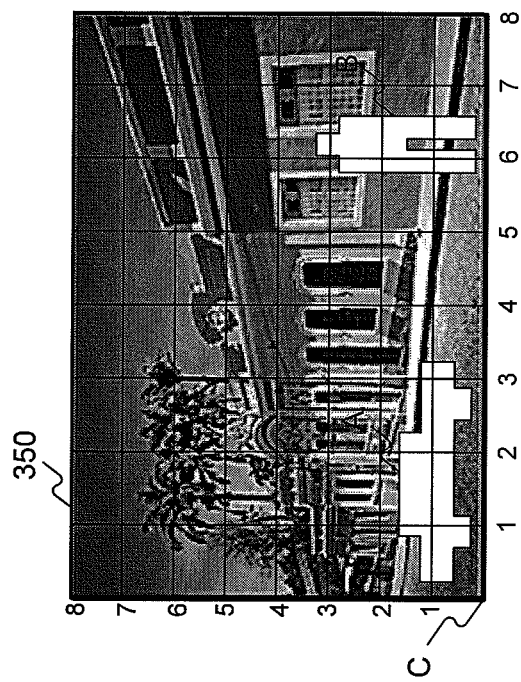
FIG. 3E is an example of region definitions that are identified using a Cartesian coordinate system.

FIG. 3E is an example of region definitions that are identified using a Cartesian coordinate system. In one embodiment, each object in scene 350 is mapped according to Cartesian coordinates. In this example, Cartesian coordinate mapping may be accomplished by means of determining a set of coordinates identifying the location of an object in the display of scene 350. As shown in scene 350, object A and character object B are mapped according to their identified location based on the shown Cartesian grid. Although Cartesian coordinates may be used as a standard to define a location in the display, any appropriate mapping standard may be used.

As shown in FIG. 3E, location C denotes the origin of the coordinate system in scene 350. The Cartesian coordinates may comprise a X-coordinate and a Y-coordinate determined in relation to location C. An X-coordinate may describe a horizontal direction and a Y-coordinate may describe a vertical direction. Both X-coordinates and Y-coordinates may have a positive or negative value or may have only positive values or only negative values depending on where the axes are set for the X-coordinate and the Y-coordinate in the display space. A location in the display space may be identified by specifying an X-coordinate and a Y-coordinate. A combination of an X-coordinate with a Y-coordinate will result in the location of a specific point in the display space. Additionally, multiple sets of Cartesian coordinates may be used to identify the region definitions of objects, such as region definition A (corresponding to a vehicle object) or region definition B (corresponding to a character object). Furthermore, in other embodiments, the coordinate system may be established such that the origin point (i.e., coordinate 0,0) is located in the upper left hand corner of scene 350 and the largest coordinate pair (e.g., corresponding to a resolution of a display device) may be located in the lower right hand corner of scene 350.

Figure 4B:
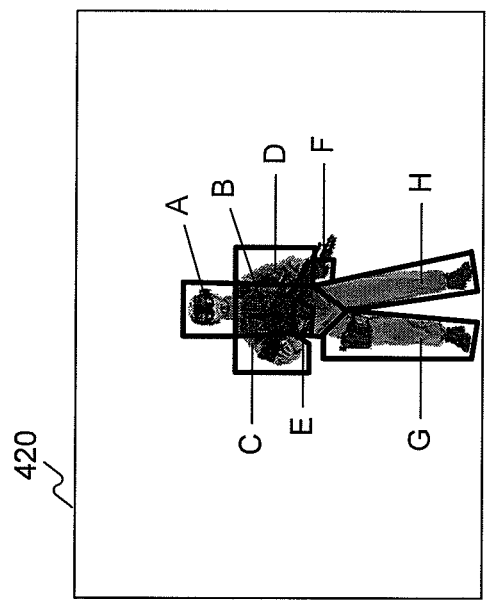
FIG. 4B is an example of a set of region definitions for a character object.
Figure 4A:
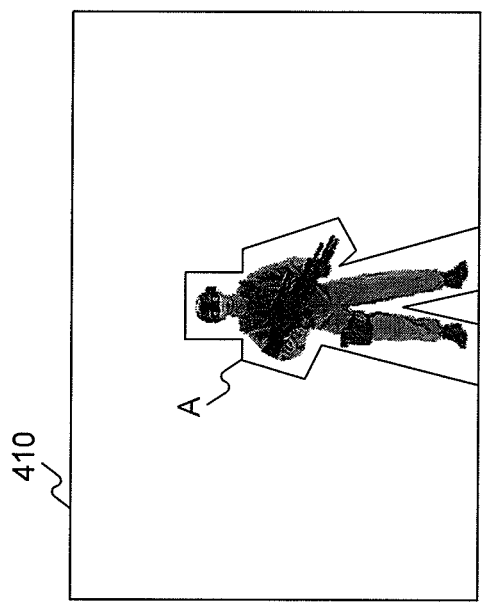
FIG. 4A is an example of a character object comprising a single region definition.

FIG. 4A is an example of a character object comprising a single region definition, consistent with disclosed embodiments. In scene 410, a region definition for the character object is identified as region A. In this embodiment, region A is a single region definition that identifies to a server (e.g., gaming server 120) the general location of a corresponding character object. As shown, the general size and shape of region definition A generally corresponds to the size and shape of the character object, although region definition A may be larger or smaller than the corresponding character object.

FIG. 4B is an example of a set of region definitions for a character object, consistent with disclosed embodiments. In scene 420, a character object comprises a set of region definitions such that each of the character object's body parts may be treated individually. For example, if the user merely wishes to select the character's head, the user may provide input that identifies a location within the region marked as region A.

Similarly, if the user wishes to select the character's right hand, the user may click within the region definition identified by region E. The remaining region definitions in this example are denoted as follows: region B identifies a region definition for the character's torso; region C identifies a region definition for the character's right arm; region D identifies a region definition for the character's left arm; region F identifies a region definition for the character's left hand; region G identifies a region definition for the character's right leg; and region H identifies a region definition for the character's left leg.

Figure 4D:
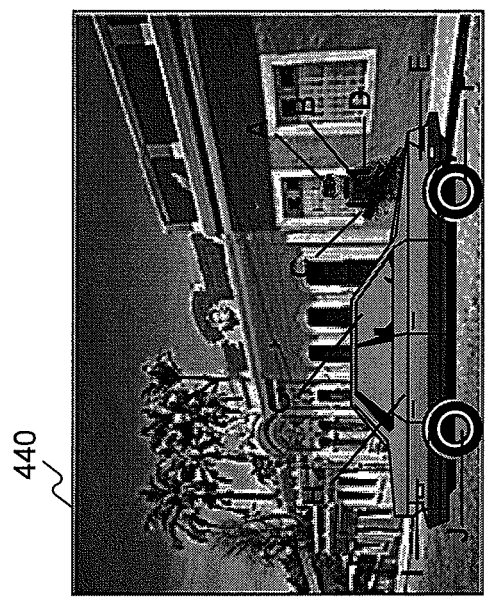
FIG. 4D is an example region definitions for overlapping objects where each of the overlapping objects comprises of a set of region definitions.
Figure 4C:
FIG. 4C is an example of region definitions for overlapping objects.

FIG. 4C is an example that shows overlapping objects, consistent with disclosed embodiments. In scene 430 an object A (i.e., a vehicle object) is shown with a character object B (i.e., a soldier). From the perspective shown in scene 430, object A overlaps with character object B. In this example, a region definition (not shown) for object A may correspond to the outline of the vehicle represented by object A. A region definition (not shown) for character object B may correspond to the visible portion of the soldier represented by character object B (i.e., the legs of character object A are not in view). Accordingly, a selection input of the location where the legs of character object B are otherwise not visible would correspond to a selection of object A.

FIG. 4D is an example of a set of region definitions for a character object and an object that comprise a set of region definitions, some of which overlap, consistent with disclosed embodiments. In scene 440, region A may represent a region definition for the character object's head; region B may represent a region definition for the character object's torso; region C may represent a region definition for the character object's right arm; region D may represent a region definition for the character object's right arm; region E may represent a region definition for the vehicle object's engine compartment; region F may represent a region definition for the vehicle object's front tire; region G may represent a region definition for the vehicle object's roof; region H may represent a region definition for the vehicle object's doors; region I may represent a region definition for the vehicle object's trunk compartment; and region J may represent a region definition for the vehicle object's rear tire.

In some implementations, it is possible that only the region definitions for the respective portions of the vehicle and character are provided. Alternatively, all of the region definitions for both the vehicle and the character may be provided, but the overlapping region definitions may be layered. In this example, the vehicle's region definitions may be layered in front of the region definitions for the character's legs, because from a viewer's point of view, the character is behind the vehicle. Thus, region definitions may also include layering information that takes into account the respective positions of objects and characters in the gaming environment.

Figure 5:
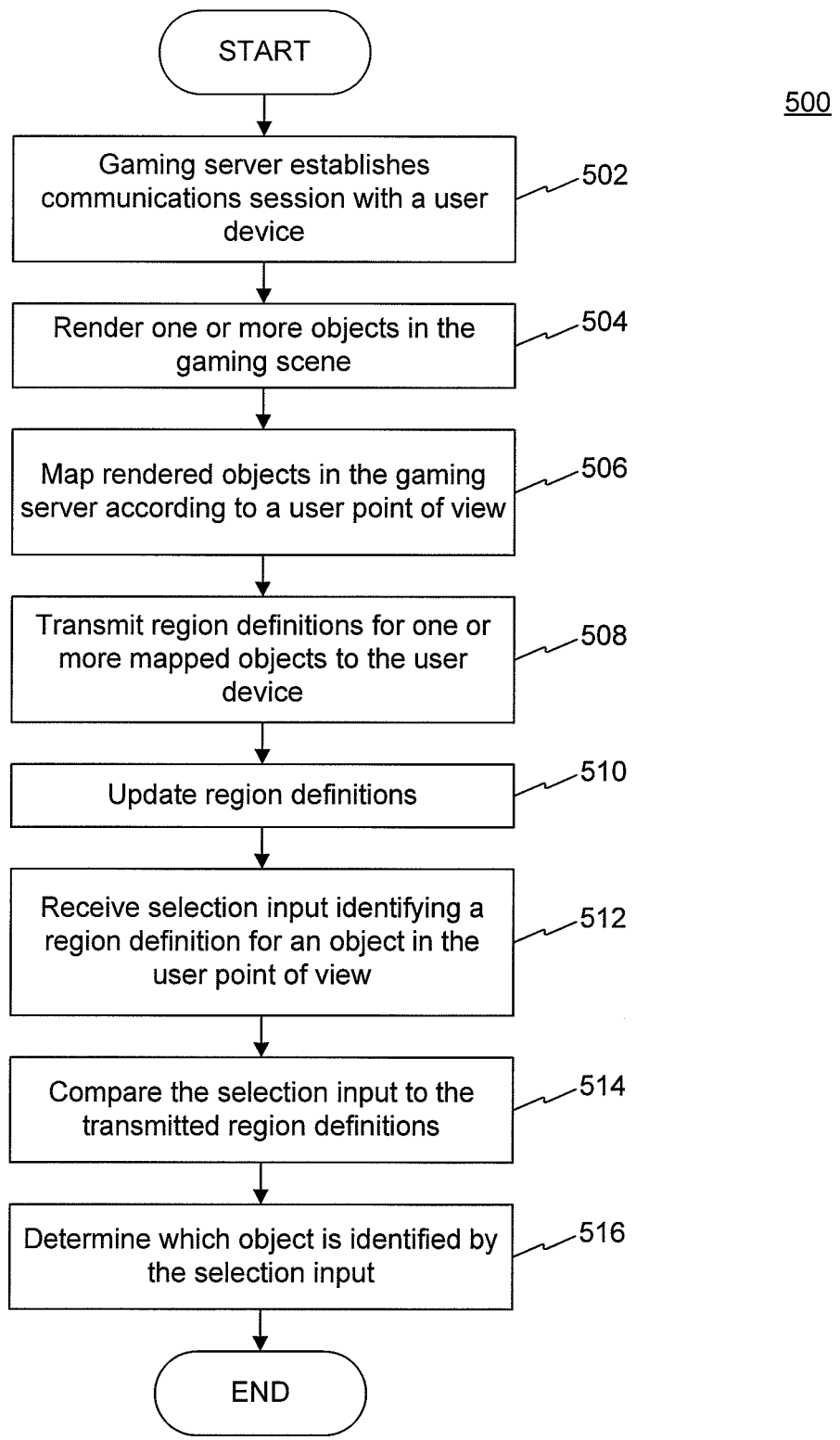
FIG. 5 is a flow diagram of an exemplary routine for accommodating latency in a server-based gaming environment.

FIG. 5 is a flow diagram of an exemplary routine 500 for accommodating latency in a server-based gaming environment, consistent with disclosed embodiments. Routine 500 executes a process for minimizing latency in a gaming environment between a server-based game (e.g., a game provided by gaming server 120) and a client device. For example, gaming server 120 may execute a game based on instructions stored in memory 124 and may transmit an interactive video stream to a client device (e.g., computer 108, gaming console 110, or display device 116) to allow the user to monitor the status of game play in the gaming environment. The video stream may include audio or an audio stream that corresponds to the video stream and may be provided to a user via speakers, earphones, or other sound propagating devices that may be configured to work in concert with the client device. Gaming server 120 may also receive selections or other input from the client device that identify to gaming server 102 how the user wishes to manipulate the gaming environment.

In block 502, gaming server 120 may establish a communications session with a client device (e.g., computer 108, gaming console 110, or display device 116) to provide access to a gaming environment. Gaming server 120 may establish the communications sessions with the client device using authentication techniques associated with any of the communications protocols outlined above, or using any additional or alternate protocol. Although described in terms of a single client device, exemplary routine 500 is not limited to a specific number of devices interacting with gaming server 120. For example, gaming server 120 may establish a communications session in block 502 with any additional or alternate number of client devices.

In one implementation, the client device may store and execute a gaming client. The gaming client may constitute a computer application of minimal size that is operable to receive an interactive video stream from gaming server 120. The size of the gaming client implemented by the client device may be small enough in size so as to not burden the computational power of the client device. In some implementations, game progress may be streamed by video or an interactive video to the client device. In order to facilitate video streaming, gaming server 120 may also obtain device-specific and connection-specific information associated with the client device in block 502. Any device-specific and/or connection-specific information obtained by gaming server 120 during block 502 may be stored in a database of gaming server 120.

In block 504, gaming server 120 may render one or more objects in the gaming environment. In one embodiment, the gaming environment provided by gaming server 120 may comprise one or more three-dimensional objects that may either be acted on or acted upon by other three-dimensional objects in the gaming environment or game scene (e.g., as discussed above, scene 310 depicts a game environment including a vehicle object A and a character object B).

For example, a user wishing to play the game may create or control a character that may be a graphical manifestation of the user's interactions with a gaming environment. The character may be manipulated by a user playing the server-based game to act on other objects in the gaming environment. The character may also be acted upon by other objects in the gaming environment. In a multi-player game, each user in the server-based gaming environment may control one or more characters. The characters may take any shape, size or configuration and are only limited by a game designer's imagination. For example, a graphical representation of a character may allow the character to appear as a fantastical creature, a monster, a human, an alien, an animal, a vehicle, or any other representation.

The game character may be one type of object but, there may be other objects that exist in a gaming environment. As discussed above, the objects available to a character in the gaming environment may take any shape, size, or configuration and are only limited by a game designer's imagination. For example, an object in the gaming environment may represent benches, chairs, terrain, space ships, weapons, keys, vehicles, animals, humans, buildings, plants, trees, rocks, and any other article whether real or imaginary.

While a character is a three-dimensional object, the character may differ from an object inasmuch as a user is given control over the actions of the character. For example, the user may exert control of the character to act on other objects, including other characters. However, a character in a gaming environment may also control an object. For example, in one embodiment, a character may be instructed by a user to acquire a weapon for use in the game. While the user, via the character, may control the actions of the weapon, the user may not directly manipulate, or take control, of the weapon in the gaming environment because the user does not control the weapon. In other words, the user may experience and act on the gaming environment through the character and may act on the environment and objects therein with the character.

Objects in the gaming environment, including characters, may comprise a number of individual objects. For example, as discussed above, a human object may comprise a number of different objects (e.g., a head, arms, torso, abdomen, and legs). Each object may be accounted for individually in the gaming environment as part of the greater object or may be accounted for together with the greater object.

In one embodiment, a character may have a certain number of life points. If the character comprises a single object (e.g., the soldier, as depicted in FIG. 4A), the character may have a single set of life points. Conversely, if the character comprises multiple objects (e.g., the soldier, as depicted in FIG. 4B), each object may be given its own set of life points. Continuing the example, the character may be interacting with an animal object in the gaming environment. The animal may injure the character by, for example, biting the character's leg. If the character is implemented as a single object, the bite may reduce the character's overall life points by a certain amount. If, however, the character is implemented as multiple objects, the bite may only reduce the character's leg life points. Furthermore, in a game in which an enemy character is attacked by a user, the user may attack or otherwise injure a specific object of the enemy character. For example, in a fighting game, a user may impact a torso object of an enemy character, or in a shooting game, a user may shoot at an arm object.

Returning now to block 504, gaming server 120 may render the objects in the gaming environment. While the objects appear to the user as existing in three-dimensions, the display may be a two-dimensional display. In order to clearly define where in the gaming environment an object is located, the object may be rendered into a two-dimensional region. For example, the rendering process may allow a three-dimensional object to be interpreted in two dimensions so that the three-dimensional object may be located on the display space. In other embodiments, the objects may be rendered for display in three-dimensions (e.g., for a three dimensional-capable display). Gaming server 120 may render some or all of the three-dimensional objects in the gaming environment on a continuing or as needed basis, depending on the implementation of the game.

At block 506, gaming server 120 may map the rendered three-dimensional objects in the gaming server according to a user's point of view of the gaming environment. For example, the user may perceive the gaming environment via a display device (e.g., display device 106, 114, or 116). Thus, the user may perceive a particular section of the entire gaming environment. The section of the gaming environment that may be displayed on the client device may depend on where in the gaming environment the user's character exists (e.g., scene 310, discussed above).

Depending on the perspective of the user and the point of view provided to the user via the client device, other objects that exist in the gaming environment may be within the point of view of the user and, thus, be visible to the user. For example, mapping may be accomplished by determining a set of coordinates identifying a location of a rendered object in a display space using Cartesian coordinates to define the location, as discussed above in connection with FIG. 3E.

At block 508, gaming server 120 may construct and transmit one or more region definitions for one or more of the mapped objects to the client device. A region definition, in one embodiment, may be provided for each object in the gaming environment. In an alternative embodiment, a region definition may be provided for each object in a user's field of view.

As discussed above, a region definition may encompass an object. In some implementations, the region definition may be larger in size than the graphical representation of the object. Accordingly, selection of any portion of the region definition, even though it may extend beyond the perimeter, may nevertheless constitute a selection of the object within the region definition. Furthermore, the size and/or shape of the region definition may change during real-time as the game progresses. Additionally, the size of the region definition may be based on the speed of movement of at least one object in the gaming environment. For example, a character in the gaming environment may move quickly relative to some other object in the gaming environment. In such an embodiment, the region definition for the character may be larger than a region definition for an object that moves more slowly in the gaming environment.

To reduce processing overhead and transmission of unneeded data to the client device, gaming server 120 may transmit a region definition to the client device for each object that is mapped and within the point of view of the user, as discussed above. Alternatively, gaming server 120 may transmit additional region definitions for additional objects to the client device. In one implementation, a user may interact with only those objects that appear in the display and there is, consequently, no need for the client device to be aware of the locations and status of other objects in the gaming environment. Accordingly, in some implementations, only region definitions for objects that are within the field of view may be transmitted to the client device.

At block 510, gaming server 120 may continue displaying the gaming environment and allow objects to move freely as they act and interact with each other in the gaming environment. As an object moves in the gaming environment, the region definitions may change. For example, the size and shape of the region definitions may be altered as the characters move in the gaming environment. At the same time, the client device receives the transmitted region definitions. However, by the time the client device receives the region definitions, due to the continued game play and updates to the region definitions in block 510, the region definitions are no longer accurate representations of the location of the objects in the gaming environment (e.g., from the perspective of gaming server 120, the objects are in a different location, as discussed above in connection with FIGS. 2A and 2B).

In block 512, gaming server 120 may receive a selection input from the client device identifying a region definition for an object in the user point of view. The selection at the client device may be produced with any input device (e.g., input device 102, input device 104, or input device 106), as described above. For example, the client device may transmit an indication of a location in the display to gaming server 120. In one embodiment, the location may be specified by Cartesian coordinates, as described above.

In block 514, since the game play in the server continues after the region definition information is transmitted to the client device, as discussed above, the region definitions for the objects displayed by the client device are no longer accurate representations of the location of the objects in the gaming environment. Accordingly, the location of the selection input may or may not coincide with the location of an object in the gaming environment. However, to compensate for this discrepancy, if the selection input location coincides with the region definition of a particular object, then the selection input location may constitute a selection of an object. For example, the client device may compare the selection input location to the previously stored region definitions that were also transmitted to the client device, as discussed in block 508, above.

At block 516, the client device may determine which object was identified by the selection input and transmit data (e.g., metadata) identifying the selected object to gaming server 120. For example, as discussed above, multiple objects may exist in the gaming environment and in the user's field of view at one time. As a result of the comparison of the selection input location to the previously stored region definitions in block 514, above, gaming server 120 may determine whether an object is identified by the selection input. In some implementations, gaming server 120 may determine that a particular object is selected because the location of the object is closest to the selection location. Alternatively, in other implementations, if the location of the selection input in the gaming environment identifies an area between the periphery of the object and the periphery of the region definition, gaming server 120 may determine that the user intended to select the object. Gaming server 120 may also base the determination on the speed of the object in the display. For example, when an object moves more quickly through a gaming environment, the selection input may be farther behind than it otherwise might have been. In this embodiment, even though the selection input may be closer to another object, gaming server 120 may determine that the selection input intended to select a fast moving object that moved to a location that was near the location of another object.

In another embodiment, a selection input may specify which object among a group of objects a user may intend to select. For example, a user may select an object representing a human character in a gaming environment with a head, arms, a torso, an abdomen, and legs. In this embodiment, it is possible that region definitions for the group of objects may overlap or may be very small. Thus, gaming server 120 may determine that a user intends to select the human object when only one selection input is received for any object that is part of a group of objects that collectively form the human object. If an additional selection input that mayor may not be indicative of a location, such as a button press, is also received with the location selection information, gaming server 120 may determine that the user intends to select one of the group objects.

As a result of the selection of an object, gaming server 120 may take an appropriate action. In some embodiments, once an object is selected, a user may indicate to gaming server 120, via a client device and network 130, the action to be taken. For example, a user may select a character, as discussed above, and indicate that the character is to perform an action allowed for the character by gaming server 120. As another example, the selection of an object may constitute aiming and/or firing a weapon at a particular location. A non-exhaustive example of actions that may be performed upon selection of an object, for explanatory purposes only, may include, walking, running, attacking, defending, casting a magical spell, saddling an animal such as a horse or a fantastical creature such as a dragon, actuating a weapon, flying a space ship, or driving or flying a vehicle.

Figure 6:
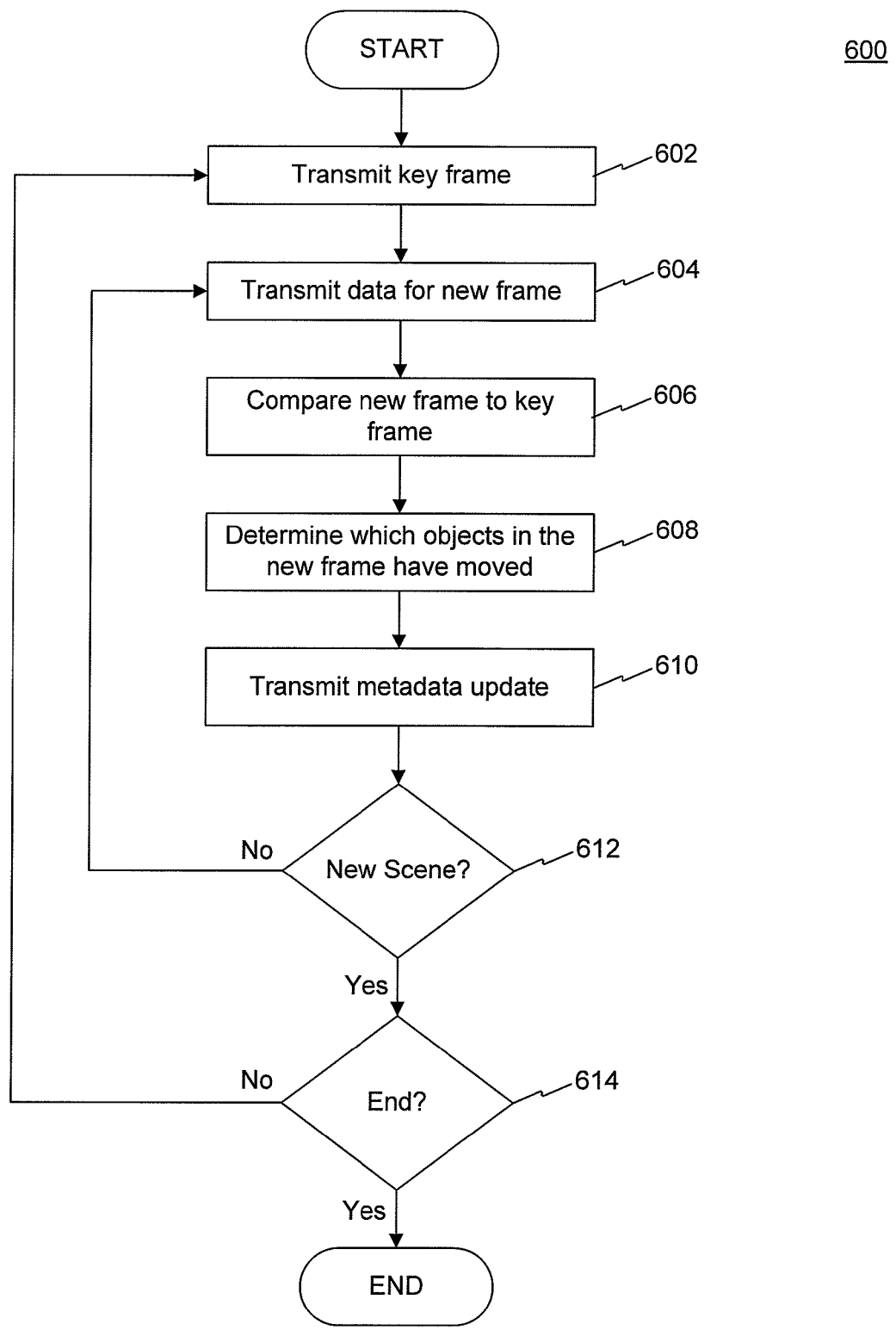
FIG. 6 is a flow diagram of an exemplary routine for transmitting metadata updates for objects that have moved in a gaming environment.

FIG. 6 is a flow diagram of an exemplary routine 600 for transmitting metadata updates for objects that have moved in a gaming environment, consistent with disclosed embodiments. As described above, system 100 provides functionality that enables a client device (e.g., computer 108, gaming console 110, or display device 116) to interact with an application executing on a gaming server (e.g., gaming server 120) over network 130.

In block 602, gaming server 120 may transmit a key frame to a client device. The key frame may include region definitions for one or more of the objects within a user's field of view. In some embodiments, the key frame may specify region definitions for all of the objects in a gaming environment if the client device possessed sufficient computing power to process the information. In general, however, the key frame may indicate the region definitions for the objects in the user's field of view.

At block 604, game play has progressed and at least one new updated region definition is transmitted to the client device, the number of transmitted region definitions depending on the number of objects in the user's field of view. Thus, the locations of the objects in the display may have changed between transmission of the key frame and transmission of data for a new frame. For example, the data for a new frame may provide an entire new frame or only the data that has changed between the preceding frame and the new frame (e.g., a delta value). The new frame may also comprise transmission of a new key frame.

At block 606, gaming server 120 may compare the key frame discussed above in relation to block 602 to the data for the new frame discussed in relation to block 304 in order to ascertain which objects have moved between frames.

In block 608, gaming server 120 may determine, as a result of the comparison discussed regarding block 606, which objects in the new frame have moved. In other words, gaming server 120 may determine whether or not the location of the object (if only one object is present in the user's field of view) in the new frame coincides with the location of the objects in the new frame.

In block 610, when gaming server 120 determines that an object, or many objects, have been identified as moved from the key frame to the new frame, gaming server 120 may prepare a metadata update for transmission to the client device. The metadata update may comprise metadata that describes the objects that have moved in the gaming environment. The metadata may describe regions of the video frame, describe other data, or describe other information that relates to game play. The transmission of the metadata update allows the client device to know which objects have moved in the gaming environment and/or where the objects have moved to in the gaming environment. The client device may update the display accordingly.

At block 612, gaming server 120 may determine whether or not the game progress indicates that a new display with different objects should be provided. Determining when a new scene is to be provided may depend, for example, upon the degree of similarity between a previous scene and the updated scene. Furthermore, a "new" scene need not be completely different from the previous scene and may only include updates to the previous scene. For example, if a character in the gaming environment enters a building, it is likely that few, if any, of the objects that were in the user's field of view outside the building will also remain in the user's field of view inside the building. If gaming server 120 determines that a new scene is not necessary, (block 612—"No"), data for a new frame will be transmitted and the method will resume at block 604, as described above. If gaming server 120 determines that a new scene is necessary due to a significant portion of the objects in a field of view changing at once, gaming server 120 may determine a new scene is necessary (block 612—"Yes"), and routine 600 proceeds to block 614.

At block 614, gaming server 120 may determine whether or not the new scene to be displayed is the end of the game. If the game is to end (block 614—"Yes"), the method ends. If, however, a new scene is necessary, a key frame will be transmitted providing the location and region definition information for each object in the new scene of the gaming environment (block 614—"No"). The method returns to block 602.

Figure 7:
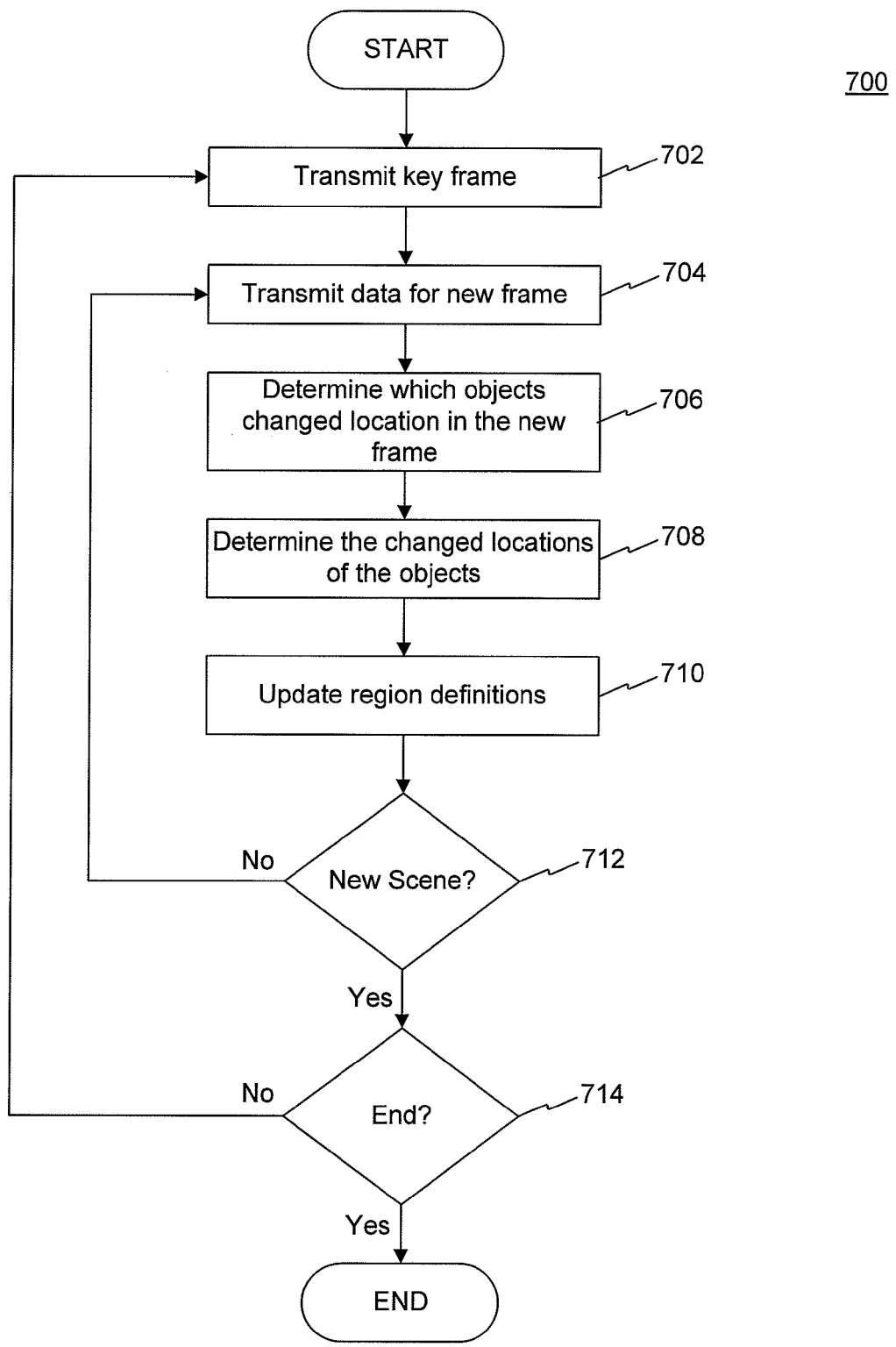
FIG. 7 is a flow diagram of an exemplary routine for transmitting and updating region definitions.

FIG. 7 is a flow diagram of an exemplary routine 700 for transmitting and updating region definitions, consistent with disclosed embodiments. In block 702, gaming server 120 may transmit a key frame to a client device. The key frame may include region definitions for one or more objects within a user's field of view. In some embodiments, the key frame may specify region definitions for all of the objects in a gaming environment if the client device possessed sufficient computing power to process the information. In general, however, the key frame may indicate the region definitions for the objects in the user's field of view.

At block 704, game play has progressed and a new updated region definition is transmitted to the client device. That is, the locations of the objects in the display may have changed between transmission of the key frame and transmission of data for a new frame. As discussed above, the data for a new frame may provide an entire new frame or only the data that has changed between the preceding frame and the new frame (e.g., a delta value). The new frame may also comprise transmission of a new key frame.

At block 706, gaming server 120 may determine which objects in the new frame have changed location, or moved. In other words, gaming server 120 may determine whether or not the locations of the object in the new frame coincide with the locations of the objects in the new frame.

In block 708, when gaming server 120 determines that an object, or many objects, have been identified as moved from the key frame to the new frame, gaming server 120 may determine the new location of the object. For example, gaming server 120 may determine new Cartesian coordinates for the new locations of the moved objects.

At block 710, gaming server 120 may update the region definitions based on the new locations of the moved objects and, as discussed above, the speed, size, and shape, of the objects themselves. In this embodiment, determining the new locations for the objects allows gaming server 120 to know where in the gaming environment the objects have moved. The region definitions may be updated accordingly and transmitted to the client device, as discussed above with respect to block 508 of routine 500.

At block 712, gaming server 120 may determine whether or not the game progress indicates that a new display with different objects should be provided. For example, if a character in the gaming environment enters a building, it is likely that few, if any, of the objects that were in the user's field of view outside the building will also remain in the user's field of view inside the building. If gaming server 120 determines that a new scene is not necessary, (block 712—"No"), data for a new frame will be transmitted and the method will resume at block 704 as described above. If gaming server 120 determines that a new scene is necessary due to a significant portion of the objects in a field of view changing at once, gaming server may determine a new scene is necessary (block 712—"Yes"), and routine 700 proceeds to block 714.

At block 714, gaming server 120 may determine whether or not the new scene to be displayed is the end of the game. If the game is to end (block 714—"Yes"), the routine ends. If, however, a new scene is necessary, a key frame will be transmitted providing the location and region definition information for each object in the new scene of the gaming environment (block 714—"No"). The routine returns to block 702.

As one of ordinary skill in the art will appreciate, one or more of blocks 502-516, 602-614, and 702-714 may be optional and may be omitted from implementations in certain embodiments. Furthermore, functionality provided by one or more of blocks 502-516, 602-614, and 702-714 may be subdivided into multiple blocks.

The foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments. For example, the described implementations include software, but systems and methods consistent with the disclosed embodiments be implemented as a combination of hardware and software or in hardware alone. Examples of hardware include computing or processing systems, including personal computers, servers, laptops, mainframes, micro-processors and the like. Additionally, although aspects of the disclosed embodiments are described as being stored in memory, one skilled in the art will appreciate that these aspects can also be stored on other types of computer-readable media, such as secondary storage devices, for example, hard disks, floppy disks, or CD-ROM, or other forms of RAM or ROM, USB media, DVD, or other high-definition optical storage media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C#, etc.), Java, C++, Objective-C, HTML, HTML/AJAX combinations, XML, or HTML with included Java applets. One or more of such software sections or modules can be integrated into a computer system or existing e-mail or browser software.

Moreover, while illustrative embodiments have been described herein, the scope of any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. Further, the blocks of the disclosed routines may be modified in any manner, including by reordering blocks and/or inserting additional blocks or deleting blocks. It is intended, therefore, that the specification and examples be considered as exemplary only, with a true scope and spirit being indicated by the following claims and their full scope of equivalents.

What is claimed is:

1. A computer-implemented method for improving network communications between computers for computer gaming, the computer-implemented method comprising:

under control of one or more computing devices configured with specific, computer-executable instructions causing transmission, over a computer network, of a gaming environment implemented on a first computing device to a second computing device of a user, wherein the gaming environment is presented on the second computing device at a delay from the implementation of the gaming environment on the first computing device due to latency between the first computing device and the second computing device over the computer network;

determining a coordinate system in the gaming environment implemented on the first computing device;

determining a boundary around the object in the gaming environment using the coordinating system;

assigning the boundary to a region definition for the object in the gaming environment, wherein the region definition comprises a first location of the object in the gaming environment;

causing transmission of the region definition to the second computing device;

receiving, from the second computing device, a result of a comparison of a second location of a selection input in the gaming environment presented on the second computing device to the region definition; and determining, based at least partly on the result received from the second computing device, that the object was selected.

2. The computer-implemented method of claim 1, wherein the result comprises a determination that the second location of the selection input identifies an area within the region definition.

3. The computer-implemented method of claim 2, wherein the result further comprises an identification of the object associated with the region definition.

4. The computer-implemented method of claim 3, further comprising updating the region definition based at least partly on a movement of the object in the gaming environment implemented on the first computing device.

5. The computer-implemented method of claim 4, wherein determining that the object was selected is based at least partly on a speed of the movement.

6. The computer-implemented method of claim 4, the operations further comprising causing transmission of the updated region definition to the second computing device.

7. The computer-implemented method of claim 4, wherein the movement causes the object to be in a different location in the implementation of the gaming environment on the first computing device than in the presentation of the gaming environment on the second computing device.

8. The computer-implemented method of claim 1, wherein the region definition and the second location of the selection input are defined using Cartesian coordinates.

9. The computer-implemented method of claim 1, wherein causing transmission of the region definition to the second computing device further comprises:

determining a field of view of the user in the gaming environment implemented on the first computing device;

determining a plurality of objects located within the field of view; and causing transmission of a plurality of region definitions, each of the plurality of region definitions corresponding to an additional location of one of the plurality of objects in the gaming environment implemented on the first computing device.

10. A non-transitory computer readable storage medium for improving network communications between computers for computer gaming, the non-transitory computer readable storage medium storing computer executable instructions that, when executed by a computer system, configures the computer system to perform operations comprising:

receiving, on a second computing device of a user, transmission of a gaming environment implemented on a first computing device, wherein the gaming environment is presented on the second computing device at a delay from the implementation of the gaming environment on the first computing device due to latency between the first computing device and the second computing device over a computer network;

determining a coordinate system in the gaming environment implemented on the first computing device;

determining a boundary around the object in the gaming environment using the coordinate system;

assigning the boundary to a region definition for the object in the gaming environment wherein the region definition comprises a first location of the object in the gaming environment;

receiving transmission of the region definition from the first computing device;

comparing a second location of a selection input in the gaming environment presented on the second computing device to the region definition; and causing transmission of a result of the comparison to the first computing device.

11. The non-transitory computer-readable storage medium of claim 10, wherein the result comprises a determination that the second location of the selection input identifies an area within the region definition.

12. The non-transitory computer-readable storage medium of claim 11, wherein the result further comprises an identification of the object associated with the region definition.

13. The non-transitory computer-readable storage medium of claim 10, the operations further comprising receiving an update to the region definition, wherein the region definition is updated based at least partly on a change in one or more of the first location, a size, or a shape of the object in the gaming environment implemented on the first computing device.

14. The non-transitory computer-readable storage medium of claim 13, further comprising receiving the update as metadata transmitted with a frame update of the gaming environment implemented on the first computing device.

15. The non-transitory computer-readable storage medium of claim 10, wherein a size and shape of the region definition is based at least partly on a size and shape of the object in the gaming environment implemented on the first computing device.

16. The non-transitory computer-readable storage medium of claim 10, wherein the region definition and the second location of the selection input are defined using Cartesian coordinates.

17. The non-transitory computer-readable storage medium of claim 10, the operations further comprising receiving a key frame from the first computing device, the key frame comprising a plurality of region definitions corresponding to a plurality of additional locations of each of a plurality of objects within a field of view of the user in the gaming environment implemented on the first computing device.

18. A system for improving network communications between computers for computer gaming, the system comprising:

a data store configured to store specific computer-executable instructions; and a computing device comprising a hardware processor and in communication with the data store, the computing device configured to implement the specific computer-executable instructions to at least:

cause transmission, over a computer network, of a gaming environment implemented on a first computing device to a second computing device, wherein the transmission of the gaming environment is delayed due to latency between the first computing device and the second computing device over the computer network;

determine a boundary around the object in the gaming environment;

assign the boundary to a region definition for the object in the gaming environment, wherein the region definition comprises a first location of the object in the gaming environment;

cause transmission of the region definition to the second computing device;

receive, from the second computing device, a result of a comparison of a second location of a selection input in the gaming environment presented on the second computing device to the region definition; and determine, based at least partly on the result received from the second computing device, that the object was selected.

19. The system of claim 18, wherein the object comprises a plurality of portions, wherein each of the plurality of portions is associated with an additional region definition, each of the additional region definitions corresponding to an additional location of a corresponding one of the plurality of portions in the gaming environment implemented on the first computing device.

20. The system of claim 18, wherein the result comprises an identification of one of the additional region definitions associated with the second location of the selection input selection input, and wherein the computing device is further configured to implement the specific computer-executable instructions to at least determine, based at least partly on the result received from the second computing device, that at least one of the object or a portion of the plurality of portions corresponding to the identified additional region definition is selected.

21. The system of claim 18, wherein the computing device is further configured to implement the specific computer-executable instructions to at least determine a coordinate system in the gaming environment implemented on the first computing device, and wherein determining the boundary around the object further comprises determining a location of the object within the coordinate system.

* * * * *